United States Patent
Ho (10) Patent No.: US 6,654,197 B1
(45) Date of Patent: Nov. 25, 2003

(54) DISC DRIVE DYNAMICS IDENTIFICATION USING SYNCHRONOUS EXCITATION SIGNAL

(75) Inventor: Hai T. Ho, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 250 days.

(21) Appl. No.: 09/689,384

(22) Filed: Oct. 12, 2000

Related U.S. Application Data (60) Provisional application No. 60/158,828, filed on Oct. 12, 1999.

(51) Int. Cl.[7] ............................................. G11B 5/596
(52) U.S. Cl. ................................................. 360/77.04
(58) Field of Search ...................................... 360/77.04

(56) References Cited

U.S. PATENT DOCUMENTS

| | | | |
|---|---|---|---|
| 5,465,183 A | 11/1995 | Hattori | ................. 360/78.9 |
| 5,995,317 A * | 11/1999 | Ottesen | ................. 360/77.04 |
| 6,292,324 B1 * | 9/2001 | Ho et al. | ................. 360/77.04 |
| 6,377,417 B1 * | 4/2002 | Ahn | ................. 360/77.04 |
| 6,417,982 B1 * | 7/2002 | Ottesen et al. | ................. 360/77.02 |

* cited by examiner

*Primary Examiner*—David Hudspeth
*Assistant Examiner*—K. Wong
(74) *Attorney, Agent, or Firm*—Westman, Champlin & Kelly, P.A.

(57) ABSTRACT

A method and system for identifying the resonance characteristics of a disc drive. A repetitive excitation signal is applied to the actuator assembly. The repetitive excitation signal has a period substantially equal to a positive integer multiple of a period of revolution of the disc. The position of the read/write head relative to a target track on the disc surface is sensed. The sensed position of the read/write head is compared to a desired position of the read/write head and apposition error signal indicative of the difference between the sensed position and the desired position is generated. The position error signal is time averaged over multiple revolutions of the disc to obtain an averaged repetitive position error signal. The resonance characteristics of the drive is determined based on a correlation of the averaged repetitive position error signal with respect to the repetitive excitation signal.

16 Claims, 5 Drawing Sheets

DISC DRIVE DYNAMICS IDENTIFICATION USING SYNCHRONOUS EXCITATION SIGNAL

CROSS-REFERENCE TO RELATED APPLICATION

This application claims the benefit of U.S. Provisional Patent Application No. 60/158,828 entitled "DISC DRIVE DYNAMICS IDENTIFICATION," filed on Oct. 12, 1999.

FIELD OF THE INVENTION

The present invention relates generally to disc drive data storage systems. More particularly, the present invention relates to identifying the dynamics of a drive.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A servo system samples the position of the read/write head relative to a particular track at a particular sampling rate and adjusts the position of the head.

In a typical servo system, the actual position of the read/write head relative to a given track is sensed and compared to the desired position of the head. A position error signal (PES) indicative of the difference between the actual and desired positions is provided to a servo controller. Based on the value of the position error signal, the servo controller provides a servo control signal to a power amplifier that amplifies the servo control signal and provides it to a voice coil motor. The voice coil motor is coupled to an actuator that moves in response to the application of the amplified control signal to the voice coil motor. An actuator arm that holds the read/write head is coupled to the actuator. In this way, the servo controller controls the positioning of the read/write head relative to a particular track on the disc surface.

Thus, a disk drive mechanical structure is composed of multiple mechanical components that are pieced together to form the final disk drive assembly. Each of these components has various resonant modes that if excited by an external energy source will cause the part to physically move at the natural frequencies of oscillation for the component in question. This movement can occur in a bending mode, a twisting mode or a combination of the two. If the component is highly undamped (i.e. the resonance is high amplitude, narrow frequency band) it will tend to oscillate with a minimal external driving energy. This oscillation results in physical motion of the data head, causing off track errors and potential fly height problems. These oscillations are often referred to as resonances.

If resonances occur in a disk drive, they can severely limit drive performance, both in seek mode and track-follow mode. However, the effects of the resonant vibrations of the drive can be attenuated if the resonance characteristics are known to some degree of accuracy. The ability to identify resonance characteristics both in the factory and in the field will be very important as drives are developed to have more sophistication in calibration and field adaptation.

The present invention provides a solution to this and other problems and offers other advantages over the prior art.

SUMMARY OF THE INVENTION

The present invention relates to identifying the dynamics of a drive.

One embodiment of the present invention is directed to a method of identifying the resonance characteristics of a disc drive. Pursuant to the method, a repetitive excitation signal is applied to the actuator assembly. The repetitive excitation signal has a period substantially equal to a positive integer multiple of a period of revolution of the disc. The position of the read/write head relative to a target track on the disc surface is sensed. The sensed position of the read/write head is compared to a desired position of the read/write head and a position error signal indicative of the difference between the sensed position and the desired position is generated. The position error signal is time averaged over multiple revolutions of the disc to obtain an averaged repetitive position error signal. The resonance characteristics of the drive are determined based on a correlation of the averaged repetitive position error signal with respect to the repetitive excitation signal.

Another embodiment of the invention is directed to a disc drive that includes an actuator assembly, sensing means, a comparator, an excitation signal generator and a processor. The actuator assembly operates in a servo loop to position a read/write head relative to a data track on a disc surface. The sensing means senses the position of the read/write head relative to a track on the disc surface. The comparator compares the sensed position of the read/write head to a desired position of the read/write head and generates a position error signal indicative of the difference between the sensed position and the desired position. The excitation signal generator generates a repetitive excitation signal having a period substantially equal to a positive integer multiple of a period of revolution of the disc. The excitation signal generator applies the repetitive excitation signal to the actuator assembly. The processor time averages the position error signal to obtain an averaged repetitive position error signal. The processor then determines the resonance characteristics of the drive based on a correlation of the averaged repetitive position error signal with respect to the repetitive excitation signal.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
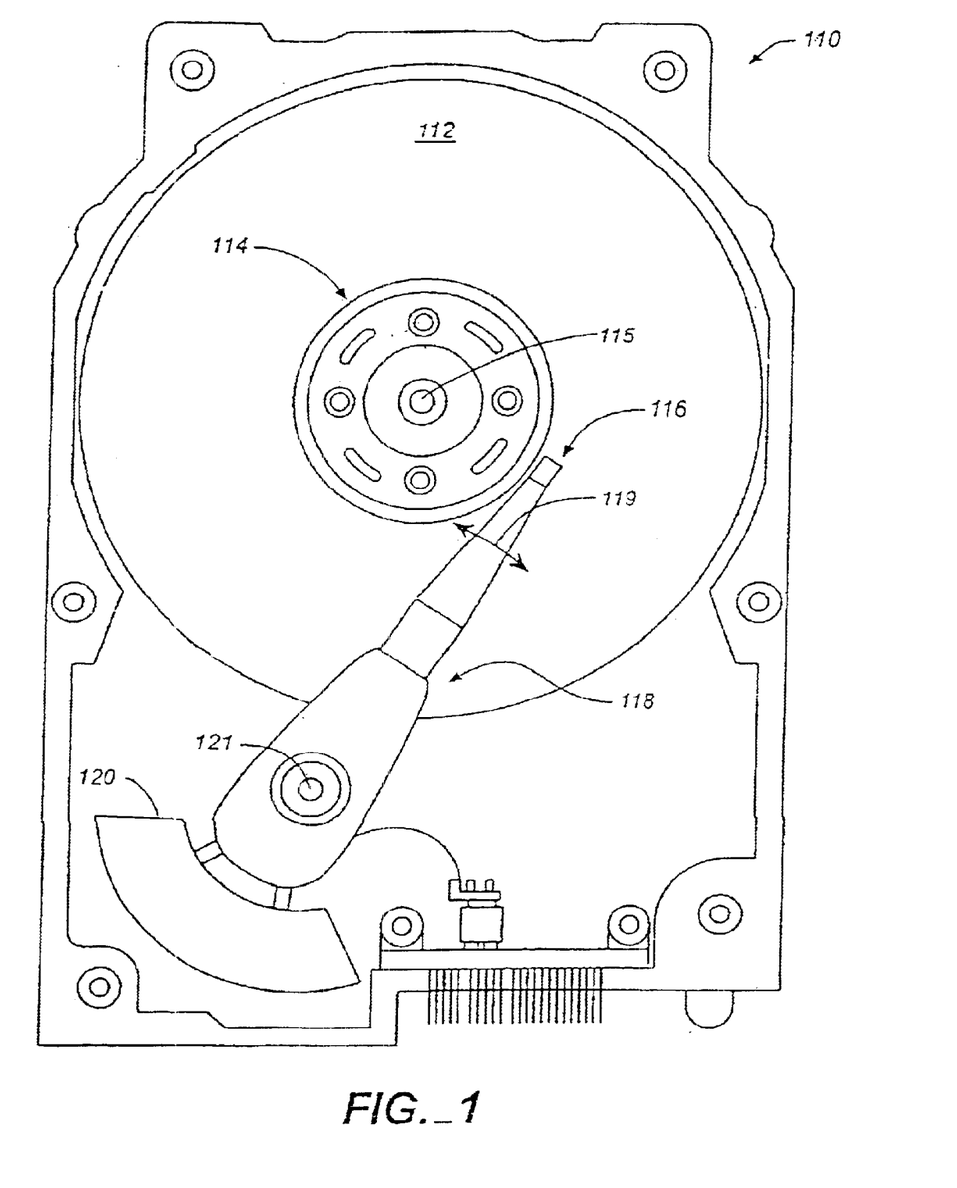
FIG. 1 is a plan view of a disc drive suitable for use with the present invention.

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head-gimbal assembly (HGA) 116 which is mounted to an actuator 118 in disc drive 110. The actuator assembly shown in FIG. 1 is of the type known as a rotary moving coil actuator and includes a voice coil motor shown generally at 120. As used herein, the term actuator assembly will refer to the combination of voice coil motor 120, actuator 118 and head-gimbal assembly 116. Voice coil motor 120 rotates actuator 118 with its attached head-gimbal assemblies 116 about a pivot axis 121 to position head-gimbal assemblies 116 over desired data tracks on the associated disc surfaces, under the control of electronic circuitry housed within disc drive 110.

More specifically, actuator 118 pivots about axis 121 to rotate head-gimbal assemblies 116 generally along an arc 119 which causes each head-gimbal assembly 116 to be positioned over a desired one of the tracks on the surfaces of discs in disc pack 112. Head-gimbal assemblies 116 can be moved from tracks lying on the innermost radius, to tracks lying on the outermost radius of the discs. Each head-gimbal assembly 116 has a gimbal which resiliently supports a slider relative to a load beam so that the slider can follow the topography of the disc. The slider, in turn, includes one or more transducers, which are utilized for encoding flux reversals on, and reading flux reversals from, the surface of the disc over which it is flying.

Figure 2:
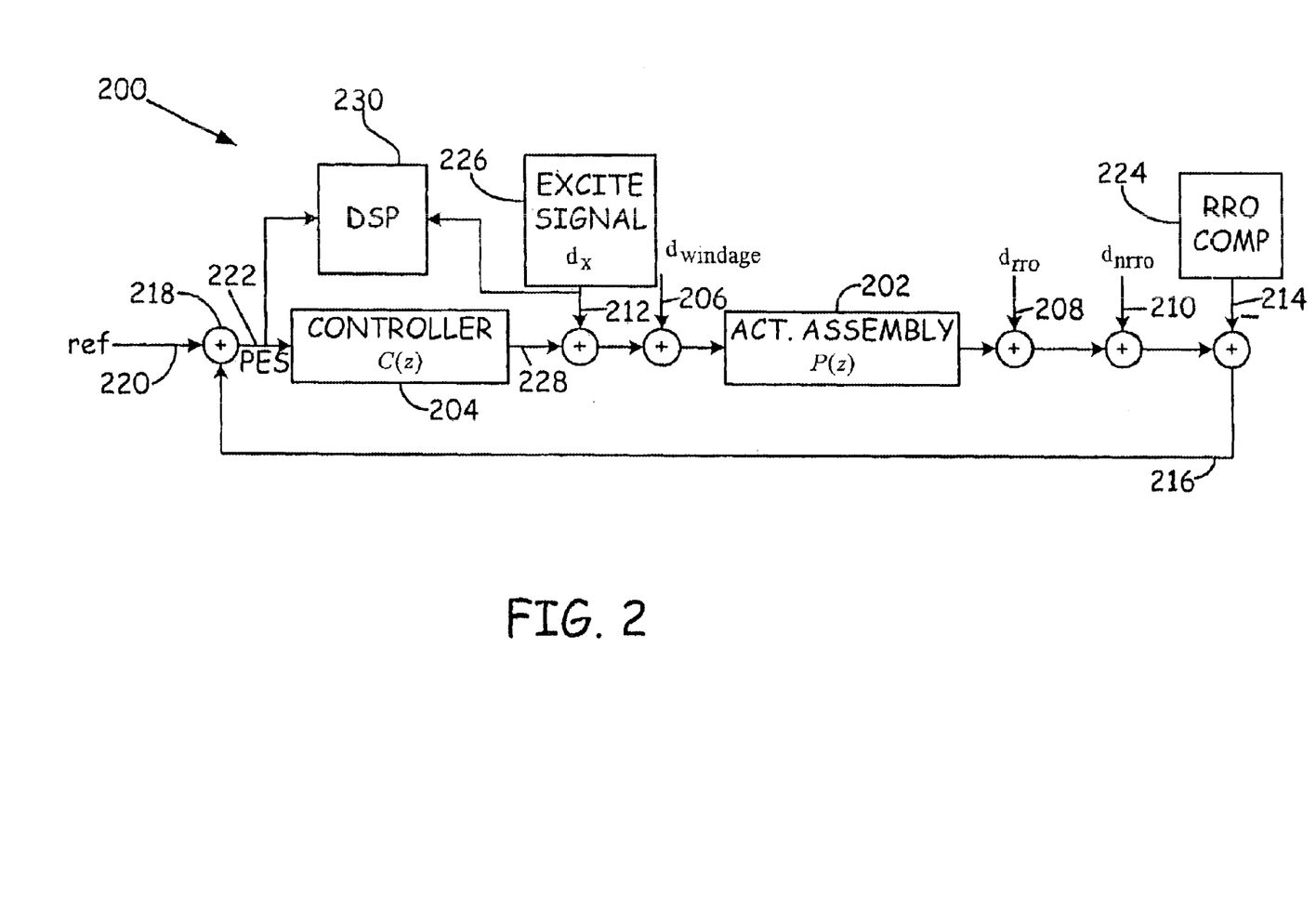
FIG. 2 is a block diagram representing a servo system employing a system for identifying the dynamics of the disc drive according to an illustrative embodiment of the present invention.

FIG. 2 is a block diagram representing a servo system 200 employing a system for identifying the dynamics of the disc drive according to an illustrative embodiment of the present invention. Actuator assembly model P(z) 202 illustratively includes a digital-to-analog converter (DAC), a power amplifier, voice coil motor 120, actuator 118 and head-gimbal assembly 116. The actual position 216 of the read/write head relative to a given track is sensed and compared to a reference signal 220 representing the desired position of the head at comparator 218. A position error signal (PES) 222 indicative of the difference between the actual and desired positions is provided to servo controller C(z) 204. Based on the value of position error signal 222, servo controller 204 provides a servo control signal 228 to the DAC/power amplifier of actuator assembly 202, which converts the digital servo control signal 216 to an analog signal, amplifies the signal and provides it to voice coil motor 120. Voice coil motor 120 actuates actuator 118 in response to the application of the amplified control signal to voice coil motor 120. In this way, servo controller 204 controls the positioning of the read/write head relative to a particular track on the disc surface.

Various disturbances affect the positioning of the read/write head. These disturbances are represented in FIG. 2 by $d_{windage}$ 206, $d_{rro}$ 208 and $d_{nrro}$ 210. $d_{windage}$ 206 is the windage disturbance. $d_{rro}$ 208 is the repeatable runout of the disc drive, that is, the runout of the read/write head, with respect to a perfectly circular path of the read/write head, which occurs repetitively with each revolution of the disc. $d_{nrro}$ 210 is the non-repeatable runout, that is, the runout that does not occur repetitively with each revolution of the disc.

Excitation signal generator 226 generates a repetitive excitation signal $d_x$ 212. According to the present invention, excitation signal $d_x$ 212 has a period that is substantially equal to a positive integer multiple of the period of revolution of the disc. That is, the excitation signal $d_x$ 212 is synchronous with the revolution index z. Illustratively, excitation signal generator 226 generates an excitation signal $d_x$ 212 that has the necessary frequency components but that is synchronous to the revolution index z. Excitation signal generator 226 provides excitation signal $d_x$ 212 to actuator assembly 202. Illustratively, excitation signal $d_x$ 212 is provided to actuator assembly 202 via servo control signal 228. This results in a repeatable runout component in the position error signal 222 which is used to correlate with excitation signal $d_x$ 212 to estimate the plant dynamics P(z) of the actuator assembly 202. In an illustrative embodiment, this estimation is performed by processor 230.

In an illustrative embodiment of the present invention, repeatable runout compensation circuit 224 is employed to compensate for the repeatable runout of the drive. Repeatable runout compensation circuit 224 estimates the magnitude of the repeatable runout $d_{rro}$ 208 and provides a repeatable runout compensation signal 214 to the servo loop. Repeatable runout compensation signal 214 is calculated to substantially cancel out the repeatable runout $d_{rro}$ 208.

In an illustrative embodiment of the present invention, the position error signal 222 is time averaged over several revolutions of the disc to obtain an averaged repetitive position error signal $PES_{avg}$. In an illustrative embodiment, this time averaging is performed by processor 230. This results in the windage disturbance and the non-repeatable runout being effectively averaged out of the position error signal 222, so that the value of the averaged repetitive position error signal $PES_{avg}$ can be considered to be sourced entirely from excitation signal $d_x$ 212. This leaves "clean" input $d_x$ and the resulting repeatable component of position error signal 222 to be used in the identification algorithm. Thus the repeatable component of position error signal 222 can be correlated with repetitive excitation signal $d_x$ according to the approximation $$PES_{avg} = Z^{-1}\left\{\frac{P(z)}{1+C(z)P(z)}\right\} * dx \qquad \text{Eq. 1}$$

wherein Z is the Z transform, C(z) is the transfer function of the servo controller, and * is the convolution operator. This relation is used to estimate the resonance characteristics P(z) of the actuator assembly 202. If the data record of the size of one revolution is not long enough, more data sets can be collected from different input signal signatures.

Figure 3:
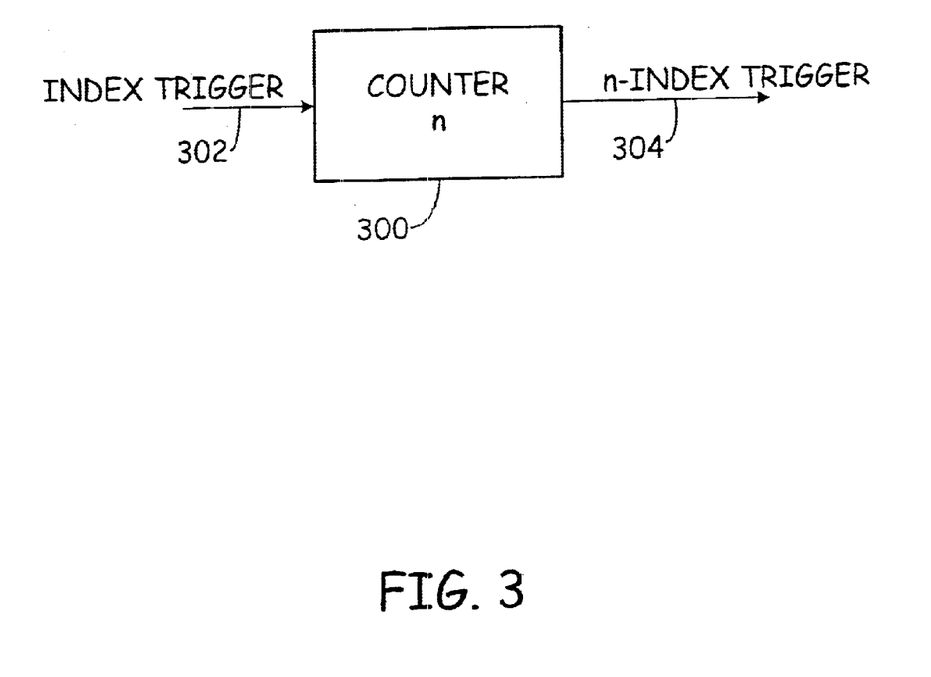
FIG. 3 is a block diagram of an index counter according to an illustrative embodiment of the present invention.
Figure 4:
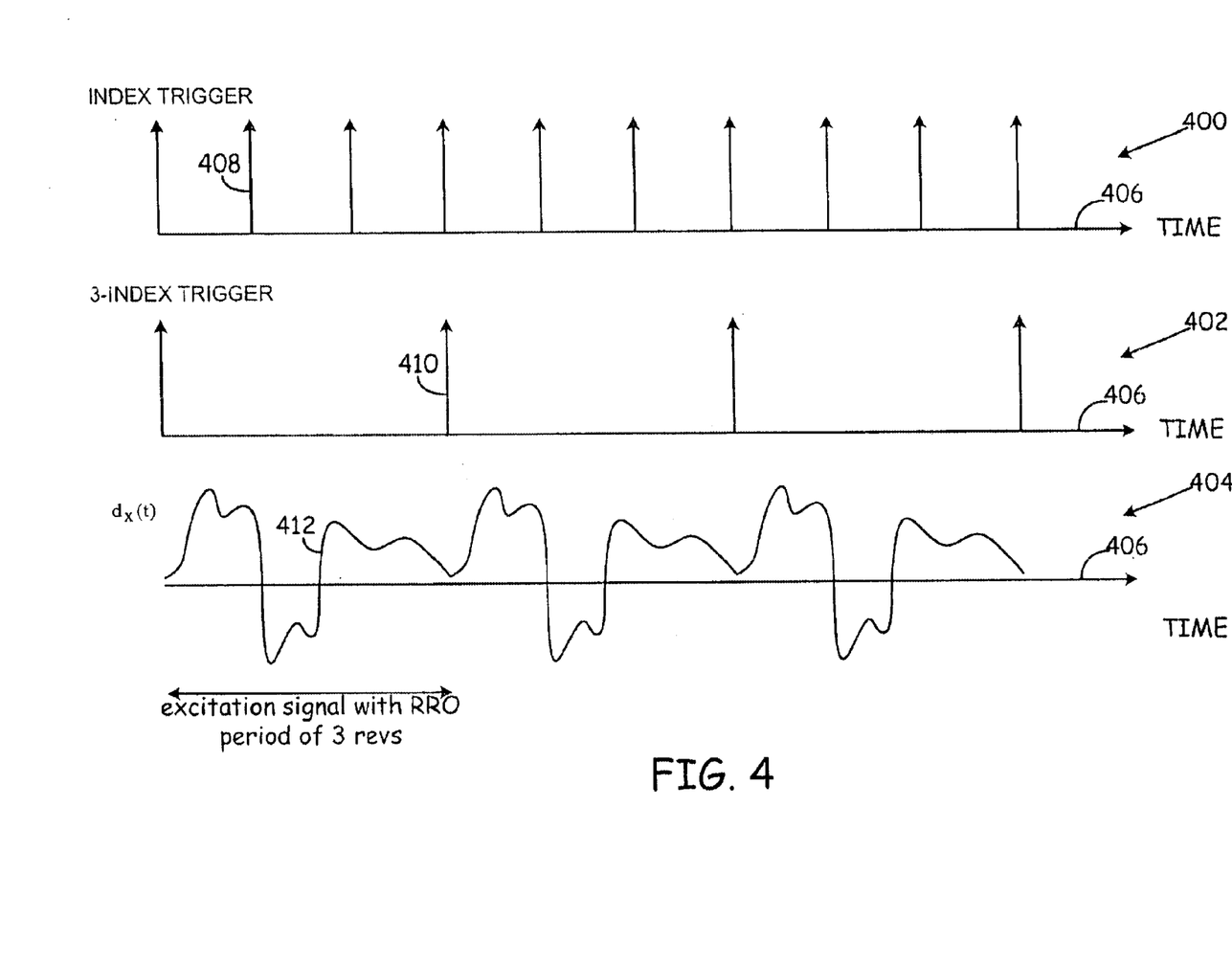
FIG. 4 includes index trigger timing plots according to an illustrative embodiment of the present invention.

In an illustrative embodiment of the present invention, the repetitive excitation signal $d_x$ 212 has a period substantially equal to the period of revolution of the disc. However, in an alternative embodiment of the invention, the excitation signal $d_x$ 212 is made to have a period substantially equal to a non-unity integer multiple of the period of revolution of the disc. This allows greater frequency resolution to be achieved. This is illustratively accomplished by providing a counter 300 as shown in FIG. 3. Counter 300 receives revolution index trigger 302, which pulses once per disc revolution, as shown by pulses 408 of FIG. 4. Note that axes 406 of FIG. 4 represent time. Counter 300 then outputs every nth pulse from the index trigger input 408, resulting in n-index trigger 304. n-index trigger 304 is provided to a timing mechanism of excitation signal generator 226. As a result, the repetitive excitation signal $d_x$ 212 is generated once every nth revolution of the disc. For example, if counter 300 is set up to output every third pulse that it receives from index trigger 302, the 3-index trigger represented by pulses 410 in FIG. 4 will result. The provision of this 3-index trigger to excitation signal generator 226 then results in excitation signal $d_x$ 212 being regenerated every third revolution of the disc, as shown by curve 412 in FIG. 4.

Figure 5:
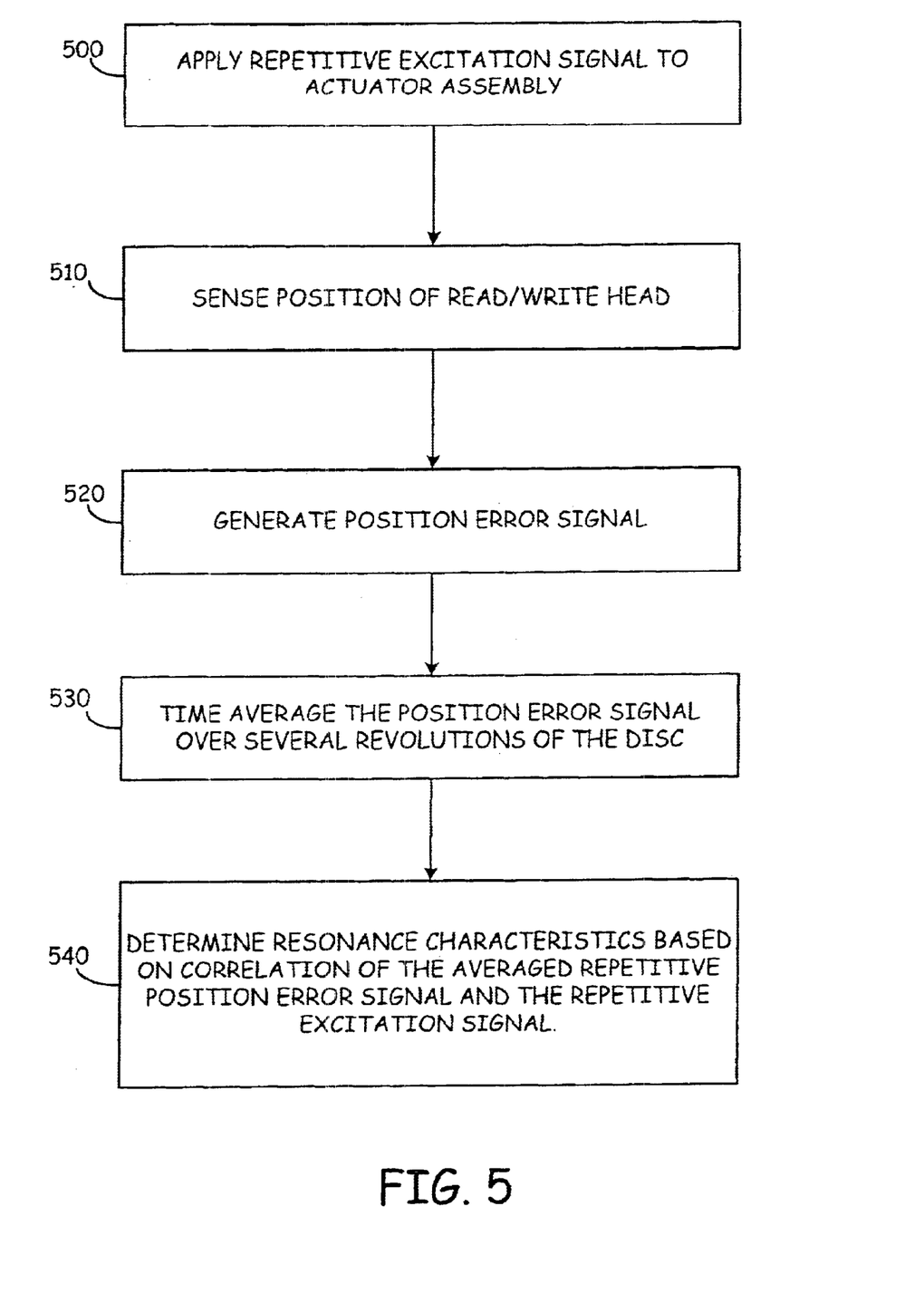
FIG. 5 is a flow chart representing a method of identifying the resonance characteristics of a disc drive according to an illustrative embodiment of the present invention.

FIG. 5 is a flow chart representing a method of identifying the resonance characteristics of a disc drive according to an illustrative embodiment of the present invention. At step 500, a repetitive excitation signal 212 is applied to the actuator assembly 202. The repetitive excitation signal 212 has a period substantially equal to a positive integer multiple of a period of revolution of the disc 112. At step 510, the position of the read/write head 116 relative to a target track on the disc surface is sensed. At step 520, the sensed position of the read/write head 116 is compared to a desired position of the read/write head 116 and a position error signal 222 indicative of the difference between the sensed position and the desired position is generated. At step 530, the position error signal 222 is time averaged over several revolutions of the disc to obtain an averaged repetitive position error signal $PES_{avg}$. At step 540, the resonance characteristics of the drive are determined based on a correlation of the averaged repetitive position error signal $PES_{avg}$ with respect to the repetitive excitation signal 212.

In summary, one embodiment of the present invention is directed to a disc drive 110 that includes an actuator assembly 202, sensing means, a comparator 218, an excitation signal generator 226 and a processor 230. The actuator assembly 202 operates in a servo loop to position a read/write head 116 relative to a data track on a disc surface. The sensing means senses the position of the read/write head 116 relative to a track on the disc surface. The comparator 218 compares the sensed position of the read/write head 116 to a desired position of the read/write head 116 and generates a position error signal 222 indicative of the difference between the sensed position and the desired position. The excitation signal generator 226 generates a repetitive excitation signal 212 having a period substantially equal to a positive integer multiple of a period of revolution of the disc. The excitation signal generator 226 applies the repetitive excitation signal 212 to the actuator assembly 202. The processor 230 time averages the position error signal 222 to obtain an averaged repetitive position error signal $PES_{avg}$. The processor 230 then determines the resonance characteristics of the drive based on a correlation of the averaged repetitive position error signal $PES_{avg}$ with respect to the repetitive excitation signal $d_x$ 212.

Another embodiment of the invention is directed to a method of identifying the resonance characteristics of a disc drive. Pursuant to the method, a repetitive excitation signal 212 is applied to the actuator assembly 202. The repetitive excitation signal 212 has a period substantially equal to a positive integer multiple of a period of revolution of the disc 112. The position of the read/write head 116 relative to a target track on the disc surface is sensed. The sensed position of the read/write head 116 is compared to a desired position of the read/write head 116 and a position error signal 222 indicative of the difference between the sensed position and the desired position is generated. The position error signal 222 is time averaged over multiple revolutions of the disc to obtain an averaged repetitive position error signal $PES_{avg}$. The resonance characteristics of the drive are determined based on a correlation of the averaged repetitive position error signal $PES_{avg}$ with respect to the repetitive excitation signal $d_x$ 212.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the drive dynamics identification scheme of the present invention may be employed in disc drives that use non-magnetic data storage means, for example, optical storage devices, without departing from the scope and spirit of the present invention. Other modifications can also be made.

What is claimed is:

1. A method of identifying the resonance characteristics of a disc drive having an actuator assembly that operates in a servo loop adapted to position a read/write head relative to a data track on a disc surface, comprising steps of:
   (a) applying a repetitive excitation signal to the actuator assembly, the repetitive excitation signal having a period substantially equal to a positive integer multiple of a period of revolution of the disc;
   (b) sensing the position of the read/write head relative to a target track on the disc surface;
   (c) comparing the sensed position of the read/write head to a desired position of the read/write head and generating a position error signal indicative of the difference between the sensed position and the desired position;
   (d) time averaging the position error signal over multiple revolutions of the disc to obtain an averaged repetitive position error signal; and
   (e) determining the resonance characteristics of the drive based on a correlation of the averaged repetitive position error signal with respect to the repetitive excitation signal.

2. The method of claim 1 wherein the repetitive excitation signal has a period nominally equal to the period of revolution of the disc.

3. The method of claim 1 wherein the repetitive excitation signal has a period greater than the period of revolution of the disc.

4. The method of claim 1 further comprising a step (f), prior to sensing step (b), of:
   (f) applying a repeatable runout compensation signal to the servo loop, the repeatable runout compensation signal adapted to compensate for repeatable runout of the read/write head relative to the target track.

5. The method of claim 1 wherein the servo loop includes a servo controller adapted to receive the position error signal and to provide a servo control signal to the actuator assembly based on the value of the position error signal and wherein a transfer function P(z) representing the resonance characteristics of the disc drive is determined according to the relation $$PES_{avg} = Z^{-1}\left\{\frac{P(z)}{1 + C(z)P(z)}\right\} * dx$$

wherein z is a revolution index, $PES_{avg}$ is the averaged repetitive position error signal, Z is the Z transform, $d_x$ is the repetitive excitation signal, C(z) is the transfer function of the servo controller, and * is the convolution operator.

6. The method of claim 1 wherein the servo loop includes a servo controller adapted to receive the position error signal and to provide a servo control signal to the actuator assembly based on the value of the position error signal and wherein applying step (a) comprises applying the repetitive excitation signal to the servo control signal.

7. A disc drive comprising:
   an actuator assembly that operates in a servo loop adapted to position a read/write head relative to a data track on a disc surface;

a sensor adapted to sense a position of the read/write head relative to a track on the disc surface;

a comparator adapted to compare the sensed position of the read/write head to a desired position of the read/write head and to generate a position error signal indicative of the difference between the sensed position and the desired position;

an excitation signal generator adapted to generate a repetitive excitation signal having a period substantially equal to a positive integer multiple of a period of revolution of the disc and to apply the repetitive excitation signal to the actuator assembly; and a processor adapted to time average the position error signal over several revolutions of the disc to obtain an averaged repetitive position error signal and to determine the resonance characteristics of the drive based on a correlation of the averaged repetitive position error signal with respect to the repetitive excitation signal.

8. The disc drive of claim 7 wherein the repetitive excitation signal has a period nominally equal to the period of revolution of the disc.

9. The disc drive of claim 7 wherein the repetitive excitation signal has a period greater than the period of revolution of the disc.

10. The disc drive of claim 9 further comprising a counter adapted to receive a revolution index indicative of the period of revolution of the disc and to pass every nth pulse of the revolution index to a timing mechanism of the excitation signal generator, where n is an integer greater than one.

11. The disc drive of claim 7 further comprising a repeatable runout compensator adapted to provide a repeatable runout compensation signal to the servo loop, the repeatable runout compensation signal adapted to compensate for repeatable runout of the read/write head relative to the target track.

12. The disc drive of claim 7 further comprising a servo controller adapted to receive the position error signal and to provide a servo control signal to the actuator assembly based on the value of the position error signal.

13. The disc drive of claim 12 wherein the processor determines a transfer function P(z) representing the resonance characteristics of the disc drive according to the relation $$PES_{avg} = Z^{-1}\left\{\frac{P(z)}{1 + C(z)P(z)}\right\} * dx$$

wherein z is a revolution index, $PES_{avg}$ is the averaged repetitive position error signal, Z is the Z transform, $d_x$ is the repetitive excitation signal, C(z) is the transfer function of the servo controller, and * is the convolution operator.

14. The disc drive of claim 7 further comprising a servo controller adapted to receive the position error signal and to provide a servo control signal to the actuator assembly based on the value of the position error signal and wherein the excitation signal generator adds the repetitive excitation signal to the servo control signal.

15. A disc drive comprising:

an actuator assembly adapted to position a read/write head relative to a data track on a disc surface; and means for identifying the resonance characteristics of the actuator assembly.

16. A method comprising a step of determining resonance characteristics based on a correlation of an averaged repetitive position error signal with respect to a repetitive excitation signal.

* * * * *

UNITED STATES PATENT AND TRADEMARK OFFICE
CERTIFICATE OF CORRECTION

PATENT NO. : 6,654,197 B1
DATED : November 25, 2003
INVENTOR(S) : Hai T. Ho

It is certified that error appears in the above-identified patent and that said Letters Patent is hereby corrected as shown below:

<u>Title page,</u>
Item [57], ABSTRACT,
Line 9, delete "apposition" and insert -- a position --.

Signed and Sealed this

Tenth Day of February, 2004

JON W. DUDAS
*Acting Director of the United States Patent and Trademark Office*